March 9, 1926. 1,576,466
L. PRYCE
STRAINING FLUID IN FLUID TRANSMISSION SYSTEM
Filed Feb. 15, 1924
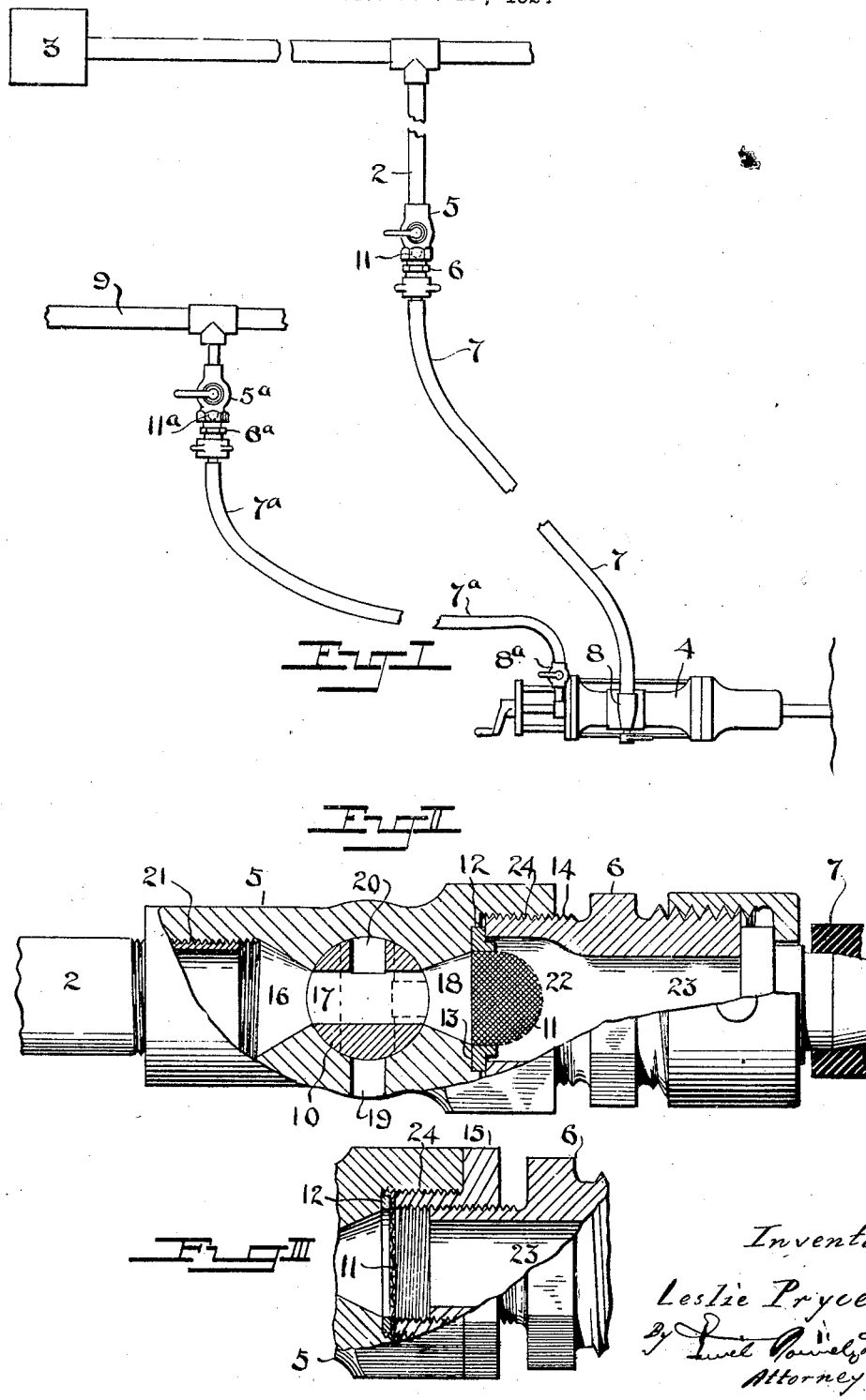

Patented Mar. 9, 1926.

1,576,466

UNITED STATES PATENT OFFICE.

LESLIE PRYCE, OF JOHANNESBURG, TRANSVAAL, SOUTH AFRICA.

STRAINING FLUID IN FLUID-TRANSMISSION SYSTEM.

Application filed February 15, 1924. Serial No. 693,145.

*To all whom it may concern:*

Be it known that I, LESLIE PRYCE, a British subject, residing at Corner House, Commissioner Street, Johannesburg, Transvaal Province, Union of South Africa, have invented certain new and useful Improvements in Straining Fluids in Fluid-Transmission Systems, of which the following is a specification.

Fluid transmission systems, such, for instance, as those for supplying air and water under pressure to rock drills, are sometimes provided with strainers through which the fluid is passed to prevent rust and the like detached from the inside of the pipes, and solid matter generally, from being carried into the machines in which the fluid is utilized.

Such strainers were however usually unsatisfactory, largely because there was no inducement to clean them regularly, with the result that they were left until clogged and then generally discarded.

The present invention aims to facilitate the periodical and effective cleaning of the strainer, and preferably to make the cleaning automatic.

In the accompanying drawings—

Fig. I illustrates a rock drilling installation,

Fig. II is an enlarged sectional view of a strainer cock, and

Fig. III is a fragmentary view of another form of strainer cock.

The usual equipment for rock drilling comprises a permanent pipe 2 by which the compressed air is conveyed from a compressor 3 to a point distant from the rock drill 4. The end of this pipe is fitted with a shut-off cock 5 into which is screwed a spud 6, and a flexible hose 7 is connected to the spud. The hose conveys the air to the inlet of the rock drill 4, which is fitted with a cock 8.

There is also provided a water main 9 having at its end a shut-off cock 5ª. A water hose 7ª is connected thereto by a spud 6ª and conveys water to the drill for the purpose of clearing the hole and preventing the formation of dust. A water supply cock 8ª is provided at the drill.

While the drill is working the cocks 5 and 5ª are left fully open and the supplies of air and water to the drill are respectively controlled by operating the cocks 8 and 8ª. After drilling is completed the drill operator,—as a preliminary to disconnecting the hoses and removing them, together with the drill, out of the area where they might be damaged by blasting,—first closes the cock 8 and then the cock 5. Consequently the hose 7 at that moment constitutes a closed reservoir of compressed air, which is utilized according to the present invention, to blow out reversely a strainer provided in the air line.

For this purpose the strainer is fitted between the plug 10 of the cock 5 and the hose 7. As shown in Fig. II, the strainer consists of a gauze dome 11 provided with a flange 12 which is seated in the socket 13 formed in the cock body and is secured therein by the screwed end 14 of the spud 6. The dome is arranged with its concave side directed against the normal flow of air, in order to collect solid matter; and it is preferably of as small superficial area as is possible without throttling the normal flow, in order to concentrate the reversely flowing air to ensure that the same effectively cleans the gauze. In the Fig. III construction, the strainer 11 is flat. Its flange 12 is retained in place by a reducing fitting 15 which is internally screwed to receive the spud 6.

The evacuation of the air is brought about automatically upon the closing of the cock 5, by making said cock of the three-way type having the usual inlet passage 16, plug passage 17 and outlet passage 18, and in addition the body port 19 and plug branch port 20 through which the hose is evacuated when the cock is turned to stop the normal flow, as indicated by the dotted lines in Fig. II.

The cock 5 is internally screwed at 21 or otherwise constructed for attaching it to the pipe 2; and its inlet passage 16 and main plug passage 17 are of the usual dimensions to correspond with the bore of the pipe 2 for which it is adapted. Its other end however is especially enlarged to accommodate the screen 11 and receive the spud 6 without materially throttling the flow of fluid. Thus in the Fig. II construction, where the spud directly clamps the screen flange 12, the part 22 of the spud bore is enlarged as compared with its normal bore 23 corresponding to the pipe 2 and the passage 17; whilst the socket 24 of the cock is enlarged to correspond. In the Fig. III construction, which utilizes a standard spud 6, the socket 24 is similarly enlarged to receive the fitting 15.

The water hose 7ª dilates materially under the pressure of the water within it, and being of considerable length—usually fifty feet,—it forms, when the cocks 5ª and 8ª are shut off, a reservoir of fluid with stored energy capable of expelling the some of the fluid under pressure. Accordingly the cock provided at 5ª is a duplicate of the cock 5 and water is evacuated through it and its strainer 11ª in the same way that the air is evacuated.

I claim—

1. The process of cleaning a strainer in a pressure fluid transmission system comprising a source of supply of fluid, which consists in shutting off a single-way, unshunted section of the transmission system at both ends, so as to cut off such section from the source of supply and also to trap therein a body of the fluid under resilient pressure tending to expel it from the said section; and thereafter evacuating such trapped fluid reversely through the strainer by such pressure.

2. The process of cleaning an air strainer in the transmission line of a compressed air power system comprising said line and a source of supply thereto, which consists in shutting off at both ends a single-way, unshunted section of the line including the strainer, so as to cut off such section from the source of supply and also to trap a body of compressed air in said section on the outflow side of said strainer; and thereafter evacuating said trapped air reversely through the strainer.

3. In a compressed air power system, an air transmission line comprising a single-way, unshunted section; a strainer in said section; and means for shutting off both ends of said section and for evacuating it from its normally-incoming end, the shut-off means at the normally-incoming end of the section being so near to the strainer that the line between them has no substantial capacity, and the section being such as to trap therein a substantial body of air between the strainer and the shut-off means at the normally-outgoing end of the section sufficient to clear the strainer effectively when blown reversely through the same.

4. In combination, an air actuated machine, a cock for controlling the operation of the same, a removable supply pipe, a permanent supply pipe, a cock controlling the terminal of the permanent supply pipe, a stationary strainer arranged between said last named cock and the removable supply pipe and devoid of connection with the former, and means for evacuating the removable supply pipe through the strainer while the last named cock is shut off.

5. In a compressed air power system, a source of supply of compressed air; an air transmission line comprising a single-way, un-shunted section; a three-way cock at the normally-incoming end of said section; a shut-off device at the other end of said section and sufficiently distant from the three-way cock to enclose a substantial body of air in said section; and a strainer in the line adjacent the three-way cock, said three-way cock being adapted in one position to pass the normal flow of air from the source of supply to said section, and in another position to cut off said section from the source of supply and to evacuate the section through the strainer.

6. In a pressure fluid transmission system, a relatively-long, unshunted pipe forming part of the transmission line; shut-off devices at the opposite ends of the pipe operable to trap a substantial body of fluid under resilient pressure in said pipe; and a strainer within said pipe immediately adjacent the shut-off device at the normal incoming end of the pipe, whereby the trapped body of fluid will be caused to pass reversely through said strainer when the said adjacent shut-off device is in one position.

In testimony whereof I affix my signature.

LESLIE PRYCE.